United States Patent
Reese et al.

(10) Patent No.: US 7,298,512 B2
(45) Date of Patent: Nov. 20, 2007

(54) PRINTING DEVICE WITH EMBEDDED DATABASE CONNECTOR

(75) Inventors: Curtis Reese, Boise, ID (US); Joe Cooper, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1017 days.

(21) Appl. No.: 10/397,458

(22) Filed: Mar. 26, 2003

(65) Prior Publication Data

US 2004/0190041 A1  Sep. 30, 2004

(51) Int. Cl.
*G06F 3/12* (2006.01)
*G06F 15/00* (2006.01)

(52) U.S. Cl. .................. 358/1.15; 358/1.13; 358/1.16

(58) Field of Classification Search ............... 358/1.15, 358/1.6, 1.13, 1.14, 1.16, 1.17, 1.18, 1.1, 358/468, 403, 404, 402, 407; 707/1, 10, 707/102, 104.1, 200, 204
See application file for complete search history.

(56) References Cited

U.S. PATENT DOCUMENTS

| | | | |
|---|---|---|---|
| 6,094,546 A | | 7/2000 | Nakazato |
| 6,108,492 A | * | 8/2000 | Miyachi .................... 358/1.15 |
| 6,407,821 B1 | | 6/2002 | Hohensee |
| 6,867,876 B1 | * | 3/2005 | Czyszczewski et al. ... 358/1.15 |
| 7,031,033 B2 | * | 4/2006 | Asahi .......................... 358/479 |
| 7,151,864 B2 | * | 12/2006 | Henry et al. ................ 382/305 |
| 2005/0219609 A1 | * | 10/2005 | Czyszczewski et al. ... 358/1.15 |

* cited by examiner

*Primary Examiner*—Dov Popovici

(57) ABSTRACT

Data is input to a printing device such as a multifunction printer. The data is converted to text data if required. An embedded database driver in the printing device converts the data to a format that is compatible with the database.

16 Claims, 2 Drawing Sheets

PRINTING DEVICE WITH EMBEDDED DATABASE CONNECTOR

FIELD OF THE INVENTION

The present invention relates generally to printing and imaging systems.

BACKGROUND

Computers and servers may incorporate databases to store large amounts of data. It is possible to have multiple databases on one computer, each having a different format. In addition, it is possible, and quite normal, for an enterprise to have multiple computers, each dedicated to a particular database type. For example, one computer might house an ORACLE database management system while another might house a MICROSOFT SQL database management system. In any case, the MICROSOFT Open Database Computing Driver (ODBC) API provides the ability to connect to a variety of client/server and mainframe databases. Connecting to a client/server or mainframe database requires a product-specific ODBC driver written to ODBC specifications. ODBC's goal is to provide seamless access to enterprise data using a single API. This capability is especially important where data may reside in many heterogeneous databases as described above.

ODBC is a widely accepted application programming interface (API) for database access that uses Structured Query Language (SQL) as its database access language. ODBC client software includes a data source component that provides connectivity to a given database engine. Thus ODBC enables applications to construct SQL statements using APIs and allows the applications to connect to a variety of database engines that process the SQL statements.

Printers have recently been manufactured with embedded web servers that enable the printer to be accessed over the Internet. A web server provides an environment in which web programs can be executed. The output of these programs can then be displayed on a web browser for use by the printer's user/operator. The web server is considered to be embedded when it resides in a hardware device's firmware instead of as software that is loaded on a client computer or network server.

A printer or other hardware device that has an embedded server typically also incorporates some type of Virtual Machine (VM) that provides an execution environment for programs that make use of industry standard Application Programming Interfaces (APIs). HEWLETT-PACKARD'S CHAIVM and SUN MICROSYSTEM'S JAVA Virtual Machines are two examples of such an execution environment. Both technologies enable servers to run JAVA applications on practically any platform.

The printer with the embedded server acts substantially like a computer on the Internet. The printer, through the web server, can receive HyperText Transfer Protocol (HTTP) commands from over the Internet and send HyperText Markup Language (HTML) content back to the requester. Depending upon the printer's network configuration, users can access the printer's web server via the Internet or via an intranet that is separated from the Internet with a firewall. In the case of HEWLETT-PACKARD's printers, providing web pages for user access is accomplished through the printer's embedded WEBSERVER application, CHAISERVER, which is a JAVA application that is executed by the CHAIVM.

One problem with databases is that the same information may have to be entered into multiple databases at different times. For example, when a patient enters a hospital to be admitted, the patient fills out a patient information sheet. This information has to be manually entered into the hospital databases. Also, if the patient goes from one department to another in the hospital, the same or additional information must be entered into separate databases in order to be printed in those departments. This requires personnel and time to enter the data each time, thus costing the patient money.

For the reasons stated above, and for other reasons stated below that will become apparent to those skilled in the art upon reading and understanding the present specification, there is a need in the art for printing systems to communicate with databases.

SUMMARY

The embodiments of the present invention encompass a method for a printing device to communicate with a database. Data is entered into the printing device. The data is linked from the printing device to the database through a database driver resident in the printing device.

Further embodiments of the invention include methods and apparatus of varying scope.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical, or mechanical changes may be made without departing from the scope of the present invention. The following detailed description is, therefore, not to be taken in a limiting sense, and the scope of the present invention is defined only by the appended claims and equivalents thereof.

The descriptions of the embodiments of the present invention refer to a printer, a printing device, or any printing system. However, the present invention encompasses any multifunction product technology such as a device that incorporates scanner, printer, and copier functions, digital or analog. The present invention is not limited to any one type of printing system.

Figure 1:
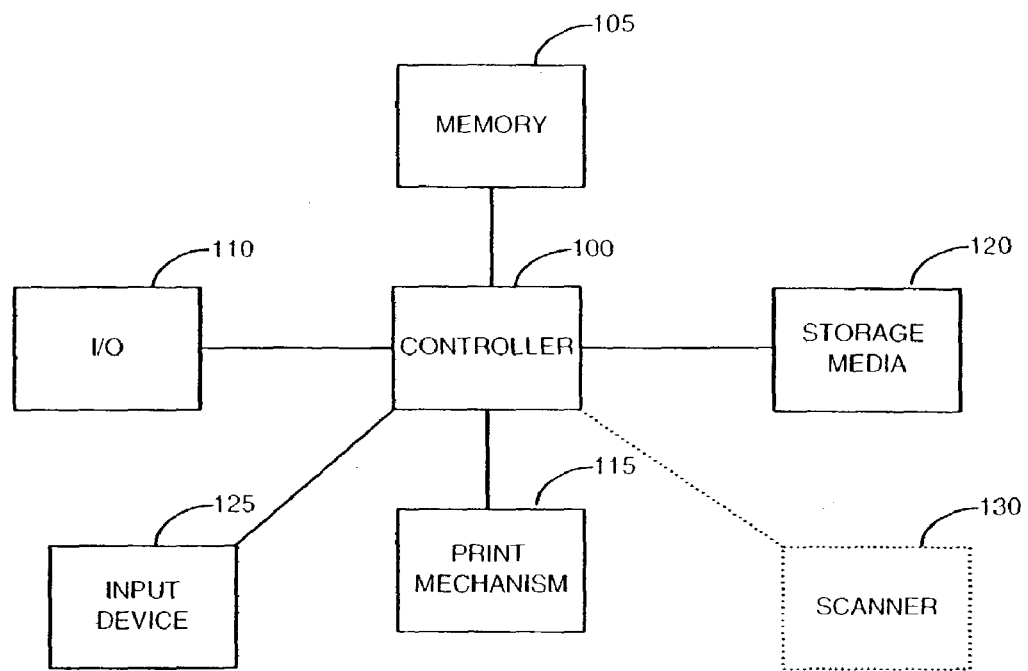
FIG. 1 is a block diagram of one embodiment of a printing device of the present invention.

FIG. 1 illustrates a block diagram of one embodiment of a printer, multifunction device, or other printing device of the present invention. The printer includes a controller 100 that controls the operation of the printer and executes the methods of the present invention. The controller 100 may be a microprocessor, microcontroller, or other type of controller circuit.

The printer memory 105 may be of the type used for temporary storage of data such as random access memory (RAM). Additionally, the memory 105 may be of the type used for permanent storage of data such as read only memory (ROM), programmable read only memory (PROM), flash memory, and/or memory cards. Other types of memory, semiconductor or otherwise, can be included as memory. Additionally, the memory may be volatile or non-volatile.

The printer memory 105 may be used to store printing tasks that have been sent to the printer from one or more computers on a network, directly from a host computer, or by data downloaded from a memory card inserted into the printer. In one embodiment, the memory stores the firmware that is executed by the controller in order to control the operation of the printer.

The printer may be comprised of additional memory such as storage media 120. The storage media memory 120 can include hard disk drives, floppy disk drives, optical drives, removable solid-state memory cards, or any other type of storage media. The storage media 120 may be fixed or removable. The storage media 120 can store print jobs indefinitely until they are scheduled to run. In one embodiment, the storage media 120 can store the embedded web server, virtual machine, and other code required to link the printer to a network such as the Internet. These items can also be stored in the printer memory 105.

The input/output (I/O) connections 110 include any network interface cards required to interface the printer to a network (e.g., Ethernet). In another embodiment, the network connection 110 is simply a USB port, IEEE 1394 port (FIREWIRE), infrared, or other type of port for coupling the printer to a host device. The present invention is not limited to any one type of network or I/O connection.

In one embodiment, a print job is sent to the printer over an Internet/intranet connection. In another embodiment, the print job to be run is sent to the printer over the I/O connection 110 in multiple packets of data. In yet another embodiment, the print job is transmitted over the I/O connection 110 in a serial bit stream of data. The present invention is not limited to any one means of data transport.

The controller 100 is also coupled to and controls the printer mechanisms 115 of the printer. For example, in an inkjet printer, the printer mechanisms 115 include the inkjet pen(s), the pen carriage device(s), and the roller that feeds the paper through the printer. If the printer is a laser printer, the printer mechanisms 115 may include the toner cartridge, the various feed rollers, the laser mirrors and optics, and the thermal devices required for laser printing. In general, the printer mechanisms 115 are the mechanical components of the printer related to transporting the print media within the printer and transferring a tangible image to the print media.

An input device 125 such as a keypad, touch sensitive display (e.g., liquid crystal display, cathode ray tube), or other type of input device may be coupled to the controller 100 to enable a printer user/operator to input commands or data to the printer controller 100 from the printer control panel.

If the embodiment of FIG. 1 is a multifunction device, it may incorporate a scanner 130. The scanner 130 can be used to read in documents for storage or conversion to text by an optical character recognition process executed by the controller 100.

The block diagram of FIG. 1 is for illustration purposes only. The present invention is not limited to any one printer or printing device architecture. For example, a multifunction device may incorporate additional functions such as copier and/or facsimile functions.

The memory 105 and 120 of the present invention includes firmware that gives the printer ODBC capability and an embedded web server. In one embodiment, a JAVA program running on the embedded Virtual Machine generates the ODBC capability. The printer can then access the databases for which it has corresponding ODBC driver software. For example, when a document is scanned in and converted from an image to text format, the text is translated to a selected database, to which the printer is coupled, by the appropriate driver software.

The embedded web server enables the printer to provide a web page that allows users to interact with the printer in order to control and/or provide information that is to be entered into a database. The information can include the database server name, database engine type, and database login information. Additionally, the web page might allow users to add additional ODBC data sources so that the printer could support proprietary or less popular database engines that are not already loaded in the printer's memory.

Figure 2:
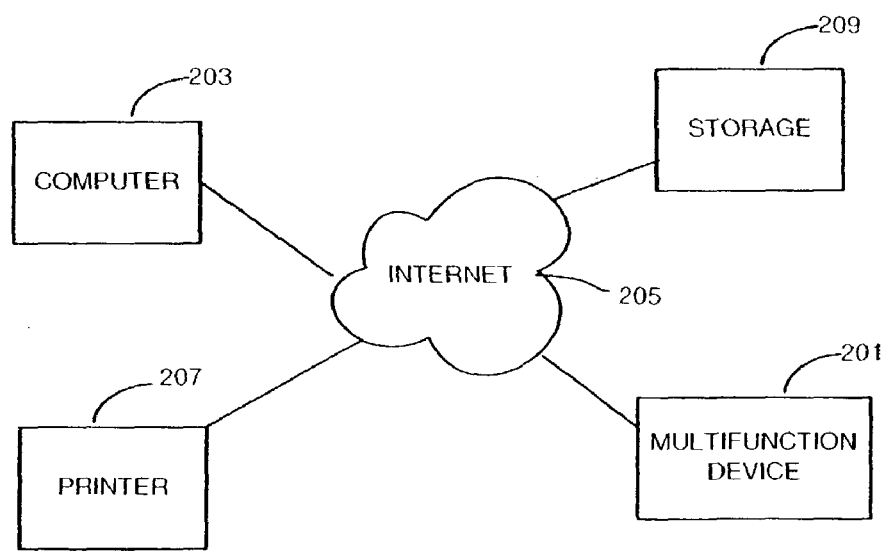
FIG. 2 is a simplified system diagram of one embodiment of a printing system of the present invention.

FIG. 2 illustrates a simplified system diagram in accordance with one embodiment of a printing system of the present invention. The system includes a multifunction device 201 that has multiple functions in addition to printing such as scanning, an embedded web server, and ODBC capability. The system also has a computer 203 coupled to the multifunction device 201 through a network 205. The network 205 can be a local area network, a wide area network, or the Internet. The computer 203 enables an operator to interact with the multifunction device 201 and to store data to certain databases.

A printer 207 may be coupled to the network 205. This printer 207 can also have the embedded ODBC capability and/or the embedded web server as well. Alternate embodiments do not include the OBDC capability or web server functionality.

The databases of the present invention can be stored in the computer's 203 memory, the memory of one of the printers/multifunction devices 201 and 207, or in a dedicated storage unit 209. The storage unit 209 is comprised of large amounts of non-volatile memory (e.g., magnetic, optical, semiconductor) for storing data. The storage unit 209 can be coupled to the multifunction device 201, printer 207, and computer 203 through the network 205 or directly to the device. The printers 201 and 207 can access the storage unit 209 directly using their embedded OBDC and Virtual Machine capabilities. The computer 203 is not necessary for the printers 201 and 207 to communicate with the databases of the present invention.

The databases of the present invention can include ORACLE, MS SQL, INFORMIX, and any other database management system for which and ODBC driver exists. The embodiments of the present invention are not limited to any one database or type of database.

Figure 3:
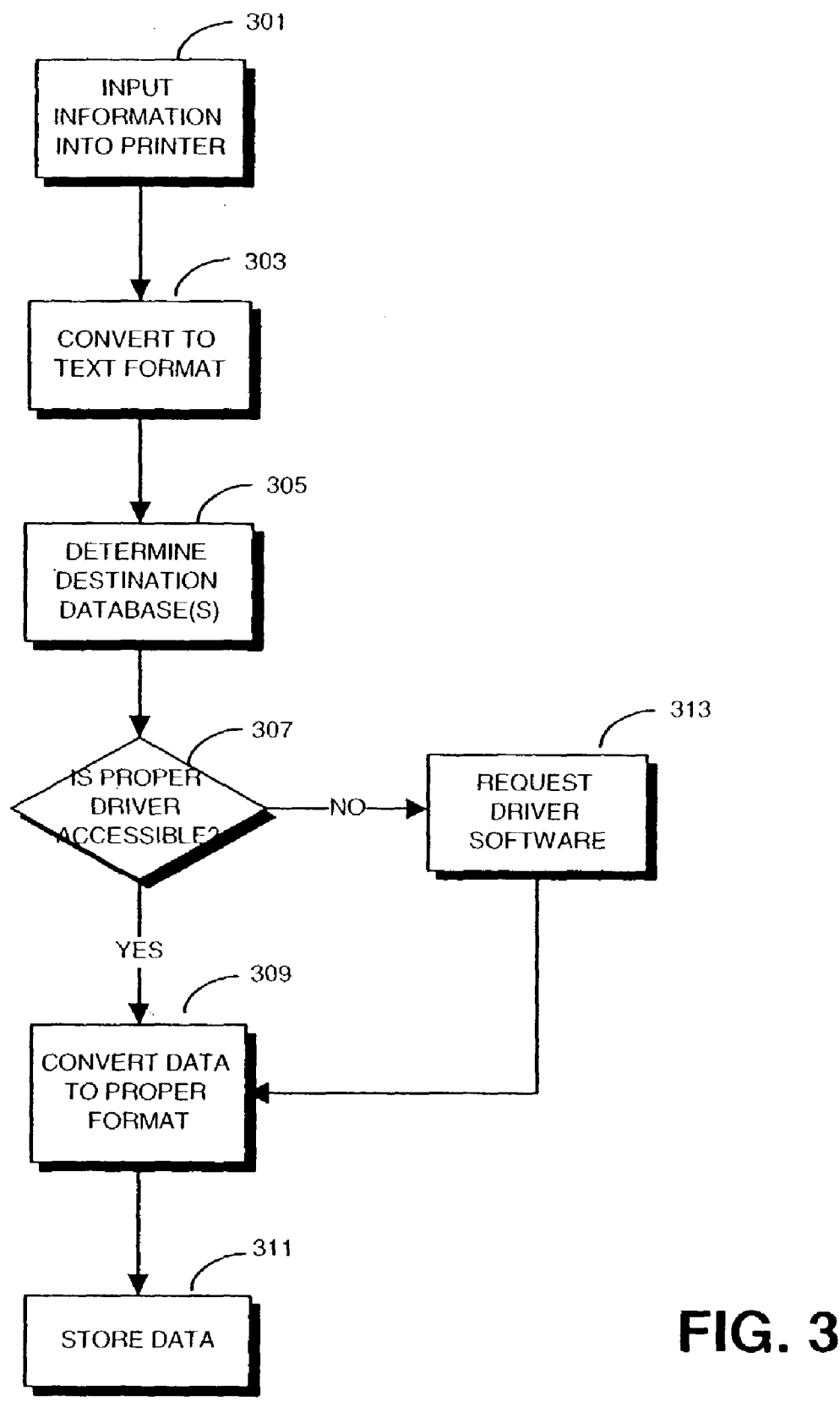
FIG. 3 is flowchart of a method for interfacing a printer with a database in accordance with one embodiment of the present invention.

FIG. 3 illustrates a flowchart of one embodiment for a method for enabling a printing device to interact with a database. The information to be stored in the database is first input to the printing device 301. A scanner portion of a multifunction device that scans in the information can be used to input the information.

A scanner typically inputs information in an image format. The information can then be converted to a text format 303 by optical character recognition processes that are well known in the art. The text information can be numeric characters, alphanumeric characters, or just alpha-characters.

The text information can then be processed according to where it was found on the scanned document, thereby determining which field of the document contained the data. In one embodiment, a scanned form may have a form designator in a particular location that indicates which form was scanned. Once this is converted to text, the process knows what type of form has been scanned and, therefore, the locations of particular data fields throughout the form.

Once the scanned image has been converted to text data, the destination database or databases for the data should be determined 305. In one embodiment, the printer operator uses a computer over a network to interact with a web page executed by the embedded web server. This web page may give the operator selectable options for different databases that the printer can access. In an alternate embodiment, the printing system operator interacts with the printer/multifunction device through a display and control panel on the device. In still another embodiment, the multifunction device knows that data from a particular form is to be input to a particular database automatically.

The desired database driver, allowing the printing device to communicate with that particular database, may not be present in the printing device. In such an embodiment, the printing device could not access the database without the ability to format the data properly for the particular database. If the database driver is not present in the system 307, the web page can give the operator the option to load the driver 313. This can be accomplished by downloading the driver from the Internet, loading it off of a portable memory device such as a disk or memory card, or downloading it from another device in the printing system.

Once the desired database driver or drivers are present in the printer, the operator can select the desired database or databases and click "apply", "enter", or other initiating item. The data from the scanned form is then formatted by the driver(s) 309 into the proper format for the database. Alternatively, if the data is automatically loaded into a particular database without operator intervention, the data is formatted by the driver(s) 309 into the proper format. The data is then stored in memory 311.

In summary, the embodiments of the present invention provide embedded database connection functionality to a printing device such as a printer or multifunction device. The printing device has ODBC client software that includes a data source component to provide connectivity to a given database engine. The OBDC client enables applications to construct SQL statements using its APIs and enables them to connect to the database engines that process the SQL statements.

What is claimed is:

1. A method for a printing device to communicate with a database, the method comprising:
   entering data into the printing device by:
      scanning a document containing fields of data to create a document image; and
      converting the document image into converted text data; and
   transmitting the converted text data from the printing device to the database through a database driver resident in the printing device.

2. The method of claim 1 wherein the database is stored in non-volatile memory coupled to the printing device.

3. The method of claim 2 wherein the printing device is coupled to the non-volatile memory over a network.

4. The method of claim 1 wherein the printing device is a multifunction device.

5. The method of claim 1 wherein the database driver is an Open Database Computing client.

6. The method of claim 1 wherein the data is converted to Structured Query Language to be read by the database.

7. The method of claim 1 wherein the database driver is an Open Database Computing Driver that acts as an application programming interface using Structured Query Language.

8. A method for a printing device to communicate with a database, the method comprising:
   entering data into the printing device;
   converting the data into a format that is accepted by the database with an Open Database Computing Driver that is resident in the printing device; and
   storing the converted data from the printing device to the database.

9. The method of claim 8 wherein the database is stored on a network storage device coupled to the printing device.

10. The method of claim 8 wherein the database is part of the printing device.

11. A method for a printing device to communicate with a database, the method comprising:
    entering an image into the printing device;
    converting the image to predetermined fields of data;
    determining a destination database;
    converting each predetermined field of data into a format that is accepted by the database with an Open Database Computing Driver that is resident in the printing device; and
    storing the converted fields of data into the database.

12. The method of claim 11 and further including requesting selection of a database with a web page generated by a web server embedded in the printing device.

13. The method of claim 11 and further including requesting the Open Database Computing Driver.

14. The method of claim 13 wherein requesting the Open Database Computing Driver includes generating a web page with an embedded web server in the printing device to request the driver.

15. A printing system comprising:
    a storage device comprising non-volatile memory that stores a database; and
    a printing device, coupled to the storage device, having an Open Database Computing Driver that is compatible with the database such that the embedded database driver converts data from the printing device into a format compatible with the database.

16. A printing device comprising:
    means for entering data into the printing device;
    means for converting the data into a format that is accepted by the database with an Open Database Computing Driver that is resident in the printing device; and
    means for storing the converted data from the printing device to the database.

* * * * *